United States Patent [19]
Resch

[11] Patent Number: 5,026,124
[45] Date of Patent: Jun. 25, 1991

[54] BRAKING SYSTEM FOR A ROAD VEHICLE EQUIPPED WITH A DRIVE-SLIP CONTROL (ASR) AND AN ANTI-LOCK SYSTEM (ABS)

[75] Inventor: Reinhard Resch, Stuttgart, Fed. Rep. of Germany

[73] Assignee: Daimler-Benz AG, Fed. Rep. of Germany

[21] Appl. No.: 457,185

[22] Filed: Dec. 26, 1989

[30] Foreign Application Priority Data

Jan. 13, 1989 [DE] Fed. Rep. of Germany ....... 3900850

[51] Int. Cl.$^5$ .......................... B60T 8/64; B60T 8/32; B60T 8/48; B60T 8/88
[52] U.S. Cl. .................................. 303/100; 303/110; 303/116; 303/119; 303/92; 180/197
[58] Field of Search .................... 180/197; 303/92, 96, 303/97, 100, 103, 105, 107, 110, 116, 119, 93; 364/426.02, 426.03

[56] References Cited

U.S. PATENT DOCUMENTS 4,861,118 8/1989 Burckhardt et al. ............ 303/100 X

FOREIGN PATENT DOCUMENTS

3443880 6/1985 Fed. Rep. of Germany .
3802133 8/1989 Fed. Rep. of Germany .
2214253 8/1989 United Kingdom .
2214254 8/1989 United Kingdom .

Primary Examiner—Douglas C. Butler
Attorney, Agent, or Firm—Evenson, Wands, Edwards, Lenahan & McKeown

[57] ABSTRACT

A drive-slip control device (ASR) for a road vehicle also equipped with an anti-lock system (ABS) that works on the return-flow principle. The ASR works on the principle of decelerating a vehicle wheel tending to spin by subjecting its wheel brake to pressure. During the drive-slip control mode, the return pump of the ABS, has its inlet supply take place via a precharging pump as an auxiliary-pressure source. By an ASR control valve, the affected brake unit can be shut off from the main brake line of the brake circuit of the driven vehicle wheels. A valve arrangement, which is activatable by the output pressure of the precharging pump is provided to connect the outlet non-return valve of the precharging pump, and the ASR outlet valve (connected between the brake-fluid reservoir and the return line) to a pressure-medium line subjected to brake pressure for normal braking. In the drive-slip control mode, the valving arrangement connects the pressure-medium line to the return line and the outlet of the precharging pump to the inlet of the return pump of the brake circuit. A fault detection device is also provided.

20 Claims, 4 Drawing Sheets

BRAKING SYSTEM FOR A ROAD VEHICLE EQUIPPED WITH A DRIVE-SLIP CONTROL (ASR) AND AN ANTI-LOCK SYSTEM (ABS)

BACKGROUND AND SUMMARY OF THE INVENTION

The invention relates to a drive-slip control device (ASR) for a braking system on a road vehicle also equipped with an anti-lock system (ABS). The braking system includes a dual circuit static brake system, in which one brake circuit is assigned to the driven vehicle wheels and the other brake circuit to the non-driven vehicle wheels and wherein the two brake circuits are assigned to an outlet-pressure space of a brake unit provided for brake actuation. The system operates according to the following features:

(a) the ABS operates (at least on the brake circuit of the driven vehicle wheels) on the return-flow principle whereby, during pressure-reduction phases of the anti-lock control, a quantity of brake fluid (corresponding to that quantity of brake fluid caused to flow off from the wheel brake(s) into a return line connected to a buffer accumulator during ABS control) is pumped back into the brake unit by a return pump having an inlet side connected to a buffer accumulator and an outlet side connected to the brake unit;

(b) the ASR operates on the principle of decelerating a vehicle wheel tending to spin by subjecting its wheel brake to brake pressure from an auxiliary-pressure source, in such a way that its drive slip remains within a value range compatible with a sufficient dynamic stability of the vehicle;

(c) wherein during ASR control, brake fluid is conveyed from a reservoir of the brake unit to an inlet side of the return pump by a precharging pump (connected as an auxiliary-pressure source to the inlet side of the return pump) via an outlet non-return valve and from which (in pressure build-up phases) pressure is supplied to the wheel brake of the vehicle wheel to be decelerated by means of the control;

(d) wherein there is an ASR control valve which can be changed over from a normal braking basic position, in which brake fluid can be positively displaced into the wheel-brake cylinders of the brakes of the driven vehicle wheels as a result of the actuation of the brake unit, into an alternative functional ASR position, in which brake fluid is prevented from flowing off from the main brake line of the driving wheel brake circuit towards a respective outlet-pressure space of the brake unit; and (e) wherein there is a valve arrangement which is activatable in response to the outlet pressure of the precharging pump.

An ASR of this general type is the subject of the applicant's older, not previously published German Offenlegungsschrift No. 3,802,133 which describes, in combination with an ABS working on the known return-flow principle, an ASR working on the principle of decelerating a driven vehicle wheel tending to spin by subjecting its wheel brake to pressure. There the return pump of the ABS, assigned to the brake circuit of the driven vehicle wheels, is utilized as an auxiliary-pressure source for the ASR. This return pump is designed as a free-piston pump and is fed brake fluid from the brake-fluid reservoir of the brake system into the return line of the ABS by a precharging pump via its outlet non-return valve (in the ASR control mode). For generating brake pressure in the ASR mode, the return pump conveys brake fluid into the main brake line which is shut off from the brake unit by means of an ASR control valve. Furthermore, there is an ASR outlet valve which is connected between the return line of the brake circuit of the driven vehicle wheels and the brake-fluid reservoir. The basic position of this ASR outlet valve is its shutoff position, and only in pressure-reduction phases of the ASR is it moved into its throughflow position in which brake fluid can flow from the return line towards the brake-fluid reservoir.

During normal braking (braking not undergoing a brake-pressure control), this return line is pressureless. Consequently, a leak (in the admission-pressure supply path of the return pump in the return line and utilized for the drive-slip control), cannot be detected during normal braking. Such a leak could occur at the outlet non-return valve of the precharging pump or at the ASR outlet valve.

However, if such a leak is present and the front-axle brake circuit fails during a braking operation, then, during this braking operation, the ABS on the rear-axle driven vehicle wheel brake circuit allows this brake circuit to empty via the leak. Thus both brake circuits will fail. This complete failure of the brake system is permanent. The potential danger that with a failure of the front-axle brake circuit, the rear-axle brake circuit will also fail if the latter has a leak in the return-pump supply circuit, is naturally unacceptable. This is especially true since the probability of failure of the rear-axle brake circuit is relatively high because, by virtue of construction, it opens towards the brake-fluid reservoir via the ASR outlet valve and because the precharging pump is connected to the return line.

The object of the invention is, therefore, to improve on an ASR of the above-mentioned type, to the effect that a leak in the admission-pressure supply circuit of the return pump becomes clearly detectable (by a pedal reaction characteristic) during the actuation of the brake system even during normal braking. This danger of a complete failure of the brake system can be countered in good time.

According to the invention, this object is achieved by having a valving arrangement that is responsive to the outlet pressure of the precharging pump connect both the outlet non-return valve of the precharging pump and the ASR outlet valve (connected between the brake-fluid reservoir and the return line) to a pressure-medium line (subjected to brake pressure in a braking mode and in the drive-slip control mode), and also connect both a pressure-medium line (connecting the ASR outlet valve to the return line) and the outlet of the precharging pump to the inlet of the return pump of the brake circuit of the driven vehicle wheels.

By means of such a valving arrangement (one activatable by means of the outlet pressure of the precharging pump and in the braking mode connects the ASR non-return valve of the precharging pump and the ASR outlet valve to a pressure-medium line, subjected to the brake pressure and in the drive-slip control mode connects this pressure-medium line to the return line of the brake system and the outlet of the precharging pump to the inlet of the return pump, which acts as an ASR auxiliary-pressure source) during normal braking both the ASR outlet valve and the outlet non-return valve of the precharging pump can be checked in terms of leaks. A leak of these functional elements is detectable from a disproportionate yielding of the brake pedal.

A fault detection of this kind can be demonstrated objectively utilizing a brake-pressure sensor and a displacement sensor for monitoring the position of a brake-unit piston. Output signals between these two must be in a specific ratio to one another (assuming proper functioning of the brake system) and can be determined by a comparison of the two sensor output signals. If this ratio differs from a predetermined value (characteristic of the proper functioning of the brake system), this can be signalled to the driver acoustically and/or optically. On the assumption that the brake unit is designed as a tandem master cylinder, it is also possible to use the output signals from two displacement (or position) sensors which monitor the positions of the pistons movably limiting the outlet-pressures spaces of the master cylinder. The position of the pistons during the proper functioning of the brake system should be the same and thus the sensors should generate output signals in a specific ratio to one another.

By having the ASR control valve moved by the outlet pressure of the precharging pump into its functional position shutting off the brake unit from the main brake line of the brake circuit of the driven vehicle wheels, reduces the outlay in terms of electronic and electromechanical control and also increases functional reliability.

The same results are also obtained when the ASR outlet valve is moved by the outlet pressure of the precharging pump into its functional position making the connection between the return line and the brake-fluid reservoir and where there is a first non-return valve which is connected between the return-pump inlet and the return line of the brake circuit of the driven vehicle wheels. Here this first non-return valve is shut off by means of a relatively higher pressure at the pump inlet than the pressure in the return line. A second non-return valve is connected between a common connection of two of the hydraulically controlled outlet valve arrangements and the first outlet non-return valve. However, in this case it is necessary to have the two additional non-return valves to shut off the outlet of the precharging pump from the brake-fluid reservoir of the brake system.

By having a supply control valve, which is controlled by the outlet pressure of the precharging pump in the functional position in which it connects the delivery outlet of the precharging pump to the inlet of the return pump of the brake circuit of the driven vehicle wheels via the outlet non-return valve, also achieves a simple and functionally reliable design of the hydraulic unit of the ASR.

If there is a control slide having an actuating piston which is activatable by means of the outlet pressure of the precharging pump to cause controlled displacement of mechanical control elements that change-over the position of the jointly switchable valves, then it is advantageous if there is a control-pressure reducing valve which, during an actuation of the brake system, connects the control line providing control pressure for the hydraulically activatable valves to the brake-fluid reservoir. This allows for a substantially delay-free transition from a drive-slip control to the normal braking mode, or a braking mode which can undergo anti-lock control.

It is desirable if the control-pressure reducing valve can be moved into its functional position connecting the control line to the brake-fluid reservoir as a result of the displacement of one of the brake-unit pistons occurring during an actuation of the brake unit, or if the control-pressure reducing valve is designed as a change-over valve controlled by brake pressure.

If the structure of the precharging pump is that of a piston pump which can be driven by means of the drive provided for the return pumps, then an electrical drive motor normally provided for the precharging pump is not necessary.

A necessary design of the precharging pump as a self-priming pump can be achieved by having the precharging pump equipped with a displacement-controlled inlet valve which is moved into its open position while the pump piston is executing the final portion of its suction stroke and the initial portion of its delivery stroke and which otherwise remains in its shut off position.

A non-return valve which is moved into its through-flow position by a relatively higher pressure at the pump outlet than the control and into its shut off position by relatively higher pressure in the control line than the pump outlet, simply ensures that the valves to be changed over at the onset of the drive-slip control and which are controlled by means of the outlet pressure of the precharging pump, remain held in their functional positions for the duration necessary for a drive-slip control cycle.

A brake monitoring device (DE 3,443,880 A1) for a vehicle brake system which is provided with an antilock system and operates with a hydraulic accumulator, the outlet pressure of which is monitored is known. In contrast thereto, in order to check the ability of the brake system to function, two pressure switches, which respond to different pressure thresholds in the brake system, can be utilized to detect the functioning of the brake system in a simple manner.

A fault detection device which generates an indicator signal characteristic of the proper or faulty functioning of the brake system can be obtained as a result of the processing of a first sensor output signal, which is a measure of the displacement of a piston of the brake unit occurring as a result of the actuation of the brake system, along with a second sensor output signal, which is a measure of the brake-actuating force arising as a result of the actuation. The second sensor output signal is generated by a pressure sensor which monitors the brake pressure occurring in one of the brake circuits of the vehicle (preferably the brake circuit of the driven vehicle wheels).

If the brake unit is being designed as a tandem master cylinder, then the fault detection device can comprise two displacement sensors each monitoring one of the two pistons of the tandem master cylinder and generating electrical output signals characteristic of the piston positions. As a result of a comparative processing of these output signals, the fault detection device generates indicator or warning signals characteristic of the proper or faulty functioning of the brake system.

The ASR control valve can alternatively be connected between the brake unit and the brake-fluid reservoir.

Other objects, advantages and novel features of the present invention will become apparent from the following detailed description of the invention when considered in conjunction with the accompanying drawings.

DETAILED DESCRIPTION OF THE DRAWINGS

The hydraulic dual-circuit brake system 10 (FIG. 1) is for a road vehicle which is equipped both with an antilock system (ABS) 11 and with a device for drive-slip control (ASR) 12.

Figure 1:
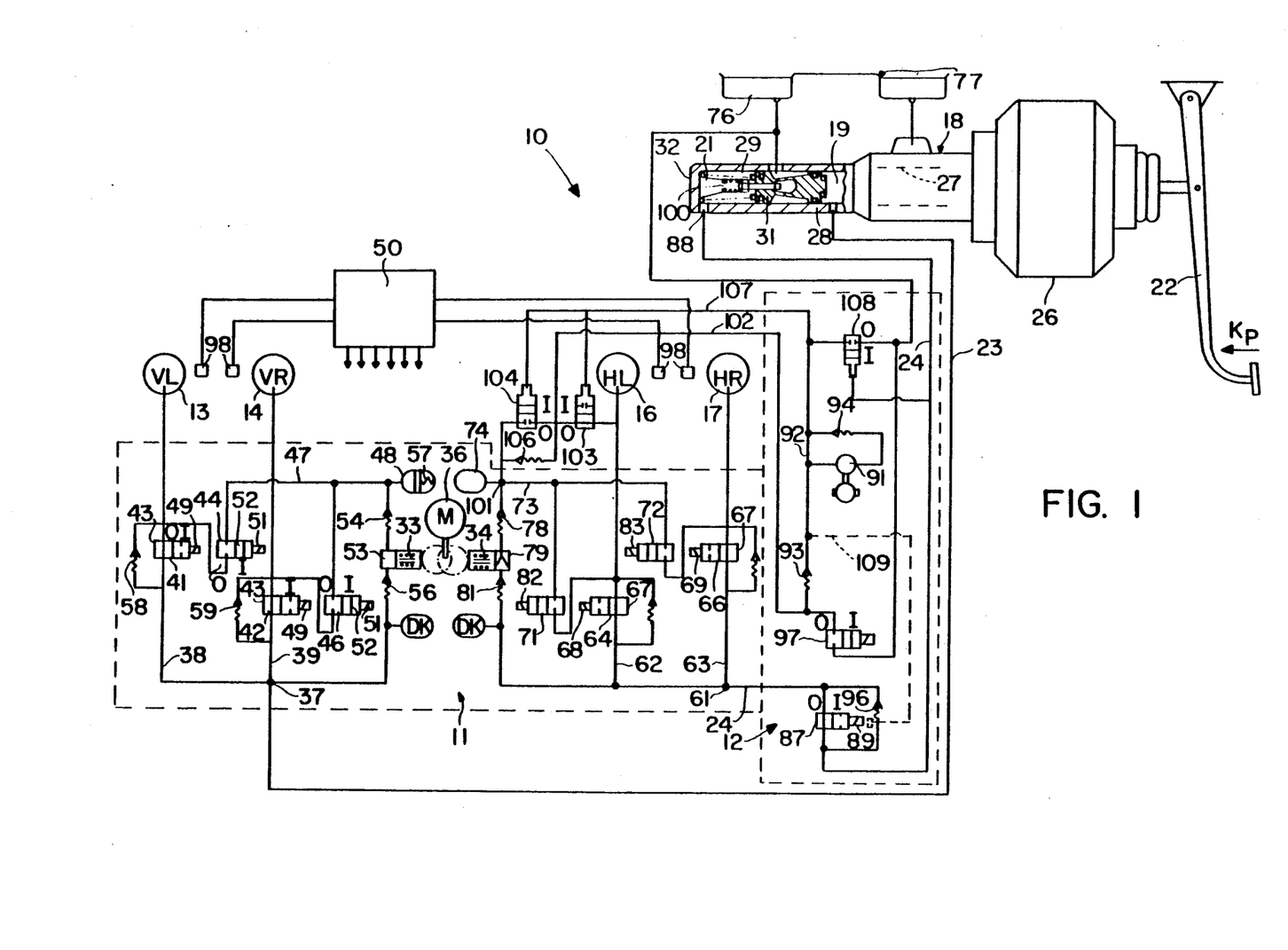
FIG. 1 shows a first exemplary embodiment of a drive-slip control device according to the invention, with ASR control and ASR outlet valves designed as solenoid valves, with a pressure-controlled test valve and with a further pressure-controlled outlet valve.

For explanatory purposes it may be assumed that the vehicle has a rear-axle drive (not shown for the sake of simplicity), that the output torque of the vehicle engine is distributed to the two rear wheels of the vehicle via a differential gear (rear axle differential), and that the wheel brakes 13 and 14 of the left and right front wheels of a vehicle are combined to form a front-axle brake circuit I while the wheel brakes 16 and 17 of the left and right rear wheels are combined to form a rear-axle brake circuit II.

The two brake circuits I and II are designed as static brake circuits. A brake unit 18, for supplying brake pressure is designed as a stepped tandem master cylinder of a type known Per se (Alfred Teves GmbH, Brake Manual, 9th edition, 1986, page 73, Bartsch Verlag Ottobrunn bei München). This unit has two outlet-pressure spaces 19, 21 which are assigned each to one of the two brake circuits I and II. The unit is under the control of the force $K_p$ by which the driver actuates a brake pedal 22. It is possible to statically build up force $K_p$ in wheel brakes 13, 14 and 16, 17 in proportion to this front-axle brake pressure $P_{VA}$ and the rear-axle brake pressure $P_{HA}$ via the respective main brake line 23 and 24 of the front-axle brake circuit I and rear-axle brake circuit II. The brake unit 18 also possesses the conventional pneumatic or hydraulic brake booster 26.

The front-axle brake circuit I is connected to the primary outlet-pressure space 19 of the tandem master cylinder 18 and the rear-axle brake circuit II to the secondary outlet-pressure space 21. The primary outlet-pressure space 19 is fixedly limited relative to the housing by the larger bore step 27 of the master-cylinder housing 28 and axially movable by a primary piston (not shown), which is guided displaceably in a pressure-tight manner in this larger bore step 27 in response to boosted pedal force, and by the floating secondary piston 31 of the tandem master cylinder 18, which is displaceably guided in a pressure-tight manner in the spacially smaller bore step 29 of the master-cylinder housing 28. The secondary outlet-pressure space 21 is movably limited in the axial direction by the secondary piston 31 and is fixed relative to the housing by the end wall 32 of the master-cylinder housing 28.

On the front-axle brake circuit I and on the rear-axle brake circuit II, the ABS 11 works on the so-called return-flow principle, according to which, during brake-pressure reduction phases of the anti-lock control, brake fluid bled from one of the wheel brakes 13 and/or 14 or 16 and/or 17 is pumped back into that outlet-pressure space 19 or 21 of the master cylinder 18 assigned to the respective brake circuit I or II.

For this return-flow there is a return piston pump 33, 34 for each of the two brake circuits I and II and a common electrically activatable eccentric pump drive 36.

The two brake-line branches 38 and 39, which extend from a branching point 37 of the main brake line 23 of the front-axle brake circuit I, have an inlet valve 41, 42, via which, during "normal" braking (braking not undergoing ABS) brake pressure is fed into the wheel brakes 13 and 14 of the front-axle brake circuit I. As long as the ABS 11 of the front axle has not responded, these valves 41, 42 assume their illustrated basic throughflow positions 0 in which the wheel-brake cylinders of the front-wheel brakes 13 and 14 are connected to the main brake line 23 of the front-axle brake circuit I via a throughflow path 43 in the respective inlet valve 41, 42. Thus, in the basic positions 0 of these inlet valves 41 and 42, brake pressure can be both built up and reduced as a result of an appropriate actuation of the brake unit 18.

Furthermore, each of the wheel-brake cylinders of the front-wheel brakes 13 and 14 are connected via a respective outlet valve 44, 46 to a return line 47 leading to a low-pressure buffer accumulator 48, which, during pressure-reduction phases of the anti-lock control, allows a rapid relief of pressure before the return pump 33 can convey the bled-off brake fluid back into the brake unit.

The outlet valves 44 and 46 of the front-axle brake circuit I assume their basic shut off position 0 as long as the ABS on the front axle has not responded. Here a respective front-wheel brake 13 or 14 is shut off from the return line 47 of the front-axle brake circuit I.

The inlet valves 41 and 42 of the front-axle brake circuit I are designed as 2/2-way solenoid valves, which when their switching magnets 49 are each activated by means of an output signal from an electronic control unit 50 (provided both for the functional control of the ABS 11 and for the functional control of the ASR 12) and can be moved individually or jointly into their energized shut off position I, depending on whether the control is to take effect on only one, or on both front wheels. Here the respective wheel brake(s) 13 and/or 14 of the front-axle brake circuit I (undergoing the control) is shut off from the main brake line 23.

In the exemplary embodiment illustrated, the 2/2-way solenoid outlet valves 44 and 46 of the front-axle brake circuit I are energized by control magnets 51 via a control output signal from the electronic control unit 50 and can be moved individually or jointly out of their basic shut off position 0 into their energized throughflow position I, depending on the particular front-wheel brake(s) 13 and/or 14 on which the ABS 11 responds. Here the respective wheel brake(s) 13 and/or 14 is connected to the return line 47 of the front-axle brake circuit I via the throughflow path 52 of the respective outlet valve 44 or 46.

When the ABS 11 responds, the pump chamber 53 of the return pump 33 of the front-axle brake circuit I is activated together with the return pump 34 of the rear-axle brake circuit II. Pump chamber 53 is connected to the return line 47 via an inlet non-return valve 54 and to the main brake line 23 of the front-axle brake circuit I via an outlet non-return valve 56. The inlet non-return valve 54 is subjected in the opening direction to a relatively higher pressure in the return line 47 and low-pressure accumulator 48. It is held in its shut off position by means of a relatively higher pressure in the pump chamber 53 than in the return line 57 and the low-pressure accumulator 48. The outlet non-return valve 56 of the return pump 33 of the front-axle brake circuit I is subjected in the opening direction to a relatively higher pressure in the pump chamber 53 of this return pump 33 than in the main brake line 23 and is held in its shut off position by means of a relatively higher pressure in the main brake line 23 than in the pump chamber 53.

The low-pressure accumulator 48 is designed as a piston/spring accumulator with a prestress of its accumulator spring 57 being equivalent to a high accumulator pressure of, for example, 4 to 6 bars. When the holding capacity of the low-pressure accumulator 48 is fully utilized, it is equivalent to approximately a pressure of 10 bars.

Whenever the ABS 11 responds, its two return pumps 33 and 34 are activated for the entire duration of the particular control cycle. By means of the inlet valves 41 and 42 and the outlet valves 44 and 46 of the front-wheel brakes 13 and 14, a decoupled single-wheel control is possible on the front axle of the vehicle. Decoupled means that brake-pressure reduction, brake-pressure holding and brake-pressure rebuild-up phases can be obtained independently on the two front-wheel brakes 13 and 14.

In order to obtain a brake-pressure reduction phase during ABS on the left front-wheel brake 13, the inlet valve 41 is moved into its energized shut off position I, and the outlet valve 44 is likewise moved into its energized throughflow position I.

To achieve a brake-pressure holding phase (during which the brake pressure in the wheel-brake cylinder of the front-wheel brake 13 in question is maintained at the value obtained until then), the inlet valve is held in its energized shutting off position I and the outlet valve 44 in its shutting-off basic position 0.

Brake-pressure build-up phases are obtained by moving the inlet valve 41 and the outlet valve 44 of the front-wheel brake 13 in question into their respective basic throughflow and shut off positions 0 during normal braking (braking not undergoing a control).

Control phases on the right front-wheel brake 14 utilizing its inlet valve 42 and outlet valve 46 are correspondingly obtained.

As has been explained so far for the front axle, the ABS 11 corresponds in terms of construction and functioning to known anti-lock systems working on the return-flow principle.

It goes without saying that instead of inlet and outlet valves 41, 44, 42, 46 for each of the two front-wheel brakes 13 and 14, there could be a 3/3-way solenoid valve (not shown) having a basic throughflow position 0 in which the particular wheel brake 13 or 14 is connected to the main brake line 23 of the front-axle brake circuit, but is shut off from the return line 47. The valve would have a first energized shut off position in which the particular wheel brake 13 or 14 is shut off both from the main brake line 23 of the front-axle brake circuit I and from its return line 47 and a second pressure-reduction or return energized position, in which the particular wheel brake 13 or 14 is connected to the return line 47 of the front-axle brake circuit I and is shut off from its main brake line 23.

Non-return valves 58 and 59 are provided in a parallel connection with the inlet valves 41 and 42 of the two front-wheel brakes 13 and 14 and are subjected in the opening direction to a relatively higher pressure in the particular front-wheel brake 13 or 14 than in the main brake line 23. These non-return valves 58 and 59 open at a pressure difference of 3 bars for the purpose of allowing a rapid brake-pressure reduction during the easing of the pedal-actuating force.

The hydraulic functional part of the ABS 11 anti-lock control on the rear-wheel brakes 16 and 17 is similar in terms of construction and mode or operation to its functional part provided for the brake-pressure control on the front-wheel brakes 13 and 14.

Brake-line branches 62 and 63 in the rear-axle brake circuit II extend from a branching point 61 of the main brake line 24 to feed brake pressure into the wheel brakes 16 and 17 of the rear-axle brake circuit II via 2/2-way solenoid inlet valves 64, 66 whenever the rear-wheel brakes 16 and 17 are activated, even in the event of a response of the drive-slip control 12. In the illustrated basic throughflow positions 0, the rear-wheel brakes 16 and 17 are connected, via the throughflow paths 67 of the two inlet valves 64, 66, to the main brake line 24 of the rear-axle brake circuit II. The inlet valves 64 and 66 of the rear-axle break circuit II are energized by their control magnets 68 and 69 by means of output signals from the electronic control unit 50 (provided both for the functional control of the ABS 11 and for that of the ASR 12) into their energized shut off position I, individually or jointly, depending on the particular vehicle wheel on which the respective control is to take effect. Furthermore, the wheel-brake cylinders (not shown) of the rear-wheel brakes 16 and 17 are also each connected via an outlet valve 71, 72 to a return line 73 of the rear-axle brake circuit II. In the event of a response of the ABS system 11, brake fluid can flow off towards the low-pressure or buffer accumulator 74 during brake-pressure reduction phases of the anti-lock control, in a similar constructional and functional manner as the front-axle brake circuit I.

The buffer accumulator 74 is connected via an inlet non-return valve 78 (corresponding in constructional and functional terms to the inlet non-return valve 54) to the pump chamber 79 of the return pump 34 of the rear-axle brake circuit II. The outlet non-return valve 81 corresponds in constructional and functional terms to the outlet non-return valve 56 of the front-axle brake circuit I and is connected to the main brake line 24 of the rear-axle brake circuit II.

The 2/2-way solenoid outlet valves 71 and 72 of the rear-axle brake circuit II are designed like those of the front-axle brake circuit. Upon energization of their control magnets 82 and 83 by means of output signals from the electronic control unit 50, they can be changed over to their respective energized position I individually or jointly, depending on whether the anti-lock control on the rear-axle brake circuit II takes place in the manner of a single-wheel control or in the manner of a control working in-phase, (for example on the known select-low principle).

The functional components of the ABS 11 (explained thus far essentially in relation to the anti-lock control on the wheel brakes 16 and 17 of the driven vehicle wheels) ar also utilized for the drive-slip control (ASR) which works on the principle of decelerating a vehicle wheel tending to spin by activating its wheel brake 16 or 17, until its drive slip remains within a value range compatible both with good propulsive acceleration and with sufficient driving stability.

The return pump 34 of the ABS 11, assigned to the rear-axle brake circuit II and the outlet pressure of which can be fed via the inlet valve 64 or 66 into the left and/or right rear-wheel brake 16 and/or 17 is utilized as an auxiliary-pressure source, from which, in the event of a response of the drive-slip control, brake pressure is supplied to the wheel brake 16 or 17 of the vehicle wheel tending to spin.

The ASR control utilizes portions of the ABS control circuit explained supra. The main brake line 24 of the rear-axle brake circuit II (leading from the secondary outlet-pressure space 21 of the brake unit 18 assigned to the rear-axle brake circuit II to the branching point 61 of the said main brake line 24) can be shut off by means of an ASR control valve 87 connected between the rear-axle brake-pressure outlet 88 of the brake unit 18 and the said branching point 61, to which the outlet side of the outlet non-return valve 81 of the return pump 34 of the rear-axle brake circuit II is also connected.

This ASR control valve 87 is designed as a 2/2-way solenoid valve, having a basic throughflow position 0 in which the rear-axle brake-pressure outlet 88 of the brake unit 18 is connected to the main brake line 24 of the rear-axle brake circuit II.

Whenever the ASR responds, the ASR control valve 87 is moved to its energized shut off position I for the duration of activation of the ASR 12 by means of an output signal from the electronic control unit 50 operating the control magnet 89 to decouple the brake unit 18 from the rear-axle brake circuit II.

As a further functional element of the ASR 12, there is a precharging pump 91 which is driven by means of its own electric drive motor 84 under the control of output signals from the electronic control unit 50. The precharging pump 91 delivers brake fluid out of that chamber 76 of the brake-fluid reservoir 77 of the brake system 10 assigned to the rear-axle brake circuit II and into the pump chamber 79 of the return pump 34 of the rear-axle brake circuit II via its delivery outlet 92, opened by hydraulically activated valve 104 (in response to pressure from pump outlet 92 via line 107) and outlet non-return valve 93. The outlet non-return valve 93 of the precharging pump 91 is subjected in the opening direction to the relatively higher outlet pressure of the precharging pump 91 than the pressure in the low-pressure accumulator 74 or the return line 73 of the rear-axle brake circuit II and is otherwise shut off.

The outlet pressure and the delivery capacity of the precharging pump 91 are each calculated sufficiently high to ensure that the stream of brake fluid from the precharging pump 91, or the buffer accumulator 74 to the return pump 34, cannot break away while the latter is working as a brake-pressure source in the ASR mode. The outlet-pressure level of the precharging pump 91 is limited by a pressure-limiting non-return valve 94, connected in parallel with the precharging pump 91.

The return pump 34 of the rear-axle brake circuit II, like the return pump 33 of the front-axle brake circuit I, is designed as a piston pump. In order that the return pump 34 of the rear-axle brake circuit II can convey brake fluid into this brake circuit II, it is necessary to have a minimum inlet pressure which is guaranteed by the precharging pump 91.

Since, on the assumption of a sufficiently high-powered drive 36, a piston pump can generate an outlet pressure which can be substantially higher than the maximum pressure necessary for subjecting the rear-wheel brakes 16 and 17 to the requisite brake pressure, a limitation of the outlet pressure of the return pump 34 on the rear-axle brake circuit II is also necessary. A pressure-limiting valve 96 is arranged in a hydraulic parallel connection with the ASR control valve 87 for this purpose, i.e. connected between the branching point 61 of the main brake line 24 of the rear-axle brake circuit II and the delivery outlet 88 of the brake unit 18.

In an operating situation of the vehicle in which the ASR 12 responds, the brake system 10 is not actuated and consequently the secondary piston 31 of the brake unit 18 is in its basic position in which the secondary outlet-pressure space 21 is in communicating connection with the brake-fluid reservoir 76, 77 of the brake system 10 via a central valve 100 of the conventional type, or via a follow-up bore. Here, if the outlet pressure of the return pump 34 exceeds the maximum permissible limit value of, for example 200 bars, brake fluid can flow off into that chamber 76 of the brake-fluid reservoir 77 assigned to the rear-axle brake circuit II.

Moreover, within the framework of the ASR 12 there is an ASR outlet valve 97 which is connected between the return line 73 of the rear-axle brake circuit II and the chamber 76 of the brake-fluid reservoir 77 of the brake system 10.

This ASR outlet valve 97 is designed as a 2/2-way solenoid valve which can be changed over between a shut off position and a throughflow position, assumed as a result of activation by means of an output signal from the electronic control unit 50. In the basic shut off position 0 of this ASR outlet valve 97, the return line 73 of the rear-axle brake circuit II is shut off from that chamber 76 of the brake-fluid reservoir 77 and in the energized throughflow position I, there is a connection between return line 73 and the brake-fluid reservoir 76, 77. This ASR outlet valve 97 is utilized for controlling brake-pressure reduction phases of the drive-slip control.

The ASR 12 works as follows (according to criteria which can be assumed to be known per se and which will be explained briefly for the sake of completeness, by a typical example,) in which the drive-slip control begins on the right rear wheel, which is on an icy surface and therefore tends to spin, whereas the left rear wheel rolls on a relatively dry road section with a good grip.

As soon as a limit value of the drive-slip of the right rear wheel of, for example 30% is reached, or exceeded (the drive slip $\lambda A$ being given by the relation $\lambda A = (V_R - V_F)/V_R$ in which $V_R$ denotes the wheel circumference speed of the vehicle wheel in question and $V_F$ denotes the vehicle speed or a reference speed approximately representing vehicle speed) then the ASR control valve 87 is changed over to its shut off position I, the ASR outlet valve 97 is changed over to its throughflow position I, the inlet valve 64 of the left rear wheel not tending to spin is changed over to the shut off position I, and the drives for the precharging pump 91 and the return-pump drive 36 are energized.

This results in brake fluid being fed into the pump chamber 79 of the return pump 34 of the rear-axle brake circuit II and this return pump generates an outlet pressure which is fed into the wheel brake 17 of the vehicle wheel tending to spin.

As soon as the right rear vehicle wheel (selected for ASR control) has its tendency to spin decreased because its wheel brake 17 is subjected to brake pressure and this vehicle wheel is decelerated thereby, the inlet valve 66 of this wheel brake 17 is at first changed over to its shut off position I, in order to hold (for a limited period of time) the brake pressure fed into the wheel brake 17 at the then value reached. This change-over of the inlet valve 66 takes place even before the tendency of the right rear wheel to spin has disappeared completely, that is to say even before its drive slip has fallen below a threshold value. Only after falling below of this threshold value, when it can be assumed that propulsion can once more be transmitted to the vehicle wheel subjected to the ASR control and with good driving stability, is the maintained brake pressure condition relaxed as will be explained later.

If, despite the now constant brake pressure prevailing in the wheel brake 17, the tendency to spin of the right rear vehicle wheel (subject to ASR control) increases again, then the inlet valve 66 is once more switched back into its basic throughflow position 0 and the brake pressure in the wheel brake 17 thereby increased further.

If the tendency of the right rear wheel to spin thereafter disappears permanently, this fact is detected by the electronic control unit 50 by virtue of the drive slip λA of the vehicle wheel in question falling below a lower limit value compatible with both good driving stability and with a sufficient propulsion transmission capacity. Accordingly the brake pressure in the right rear-wheel brake 17 is reduced. To this end, the outlet valve 72 of the right rear-wheel brake 17 is changed over to its throughflow position I in which the brake pressure can be relieved towards the brake-fluid reservoir 76, 77 of the brake system 10.

If the left rear wheel has assumed a tendency to spin during this ASR right rear wheel control, brake pressure can be built up in its wheel brake 16 by opening the inlet valve 64 of the latter, even if at the same time the brake pressure is being lowered on the right rear-wheel brake 17. It goes without saying that the brake-pressure holding and brake pressure reduction phases on the left rear-wheel brake 16 can be controlled in the same way as described in respect of the right rear-wheel brake 17, that is to say irrespective of which particular control phase is taking place on the other wheel brake.

Finally, the concluding reduction of the brake pressure on the two rear-wheel brakes 16 and 17 is obtained by turning off the energization of the precharging pump 91 and the return-pump drive 36 while the ASR outlet valve 97 is being held in its energized throughflow position I. A residual brake pressure still present in one of the wheel brakes 16 and/or 17 of the driven vehicle wheels can be completely relieved to the brake-fluid reservoir 76, 77 of the brake system 10, with the ASR outlet valve 97 in the open position.

Finally, ASR control is ended by again switching all the valves (insofar as they are not already in their basic positions) back into their "neutral-control" basic positions provided for normal braking.

The control signals, necessary for the appropriate activation of: the inlet valves 41, 42 and 64, 66, the outlet valves 44, 46 and 71, 72, the ASR control valve 87, the ASR outlet valve 97 of the return pumps 33 and 34, and, the precharging pump 91 for both the anti-lock ABS control and the ASR drive-slip control mode are obtained from the electronic control unit 50, provided jointly for the two control systems. The control unit 50 operates according to known criterion utilizing output signals from wheel-speed sensors 98 which are each individually assigned to the non-driven and the driven vehicle wheels and which (according to either level and/or frequency) generate electrical output signals which are characteristic of the wheel circumference speeds of the individual vehicle wheels and which (in reference to changes in time) also contain information on acceleration and deceleration behavior of the individual vehicle wheels.

It is assumed that an average person skilled in the art, familiar with the conventional control algorithms of an anti-lock and a drive-slip control, will find it possible on the basis of brake control knowledge, to produce the electronic control unit 50 which ensures the appropriate activation of the above-explained functional elements of the ABS 11 and ASR 12 and that there is no need for an explanation of the electronic control unit 50 which goes into the details of electronic circuit technology.

It is desirable to have the possibility of checking leaking of the outlet non-return valve 93, the precharging pump 91 and of the ASR outlet valve 97 during normal braking. To this end a test line 102 is connected to connection point 101 of the return-flow rear wheel path 73. This line permits brake fluid flow off towards the brake-fluid reservoir 76, 77 in brake-pressure reduction phases of the drive-slip control and can, via a test valve 103, be connected to or shut off from one of the wheel brakes 16 or 17. This test valve 103 is designed as a hydraulically activatable 2/2-way valve that can be changed over from its illustrated basic throughflow position 0 to its energized ASR shut off position by means of the outlet pressure of the precharging pump 91.

There is a second 2/2-way valve 104 which is activatable by means of the outlet pressure of the precharging pump 91 when ASR control is activated. The test line 102 is shut off from the inlet of the return pump 34 of the rear-axle brake circuit II in the basic shut off position 0 of the valve 104 during braking mode. The pump inlet 101 is connected to the test line 102 through the valve 104 in its functional throughflow position I during ASR. In the pressure-reduction mode, this second hydraulically activatable valve 104 is connected in series with the electrically activatable ASR outlet valve 97 and thus performs the function of a second outlet valve.

A non-return valve 106 is connected in parallel with this second hydraulically activatable valve 104. This non-return valve 106 is subjected in the opening direction to a relatively higher pressure at the pump inlet 101 than the pressure in the test line 102 and is subjected in the shut off direction to the brake pressure which can be fed into this test line 102 via the test valve 103 when the teat valve 103 is in its open position. Hence in the ASR mode, brake fluid can flow off towards the electrically activatable ASR outlet valve 97 via non-return valve 106, should the hydraulically activatable outlet valve 104 be held in its shut off position as a result of a malfunction.

A safety hydraulically activatable 2/2-way valve 108 is connected between the control line 107 (which contains the outlet pressure of the precharging pump 91 that is fed into the control chambers of the two hydraulically activatable valves 103 and 104) and that chamber 76 of the brake-fluid reservoir 77 of the brake unit 18 assigned to the rear-axle brake circuit II. The safety valve 108 has a basic shut off position 0 (corresponding to the non-actuated state of the brake unit 18) which shuts off control line 107 from the brake-fluid reservoir 76, 77. When the brake unit 18 is actuated, the safety valve 108 is changed over to its throughflow position I by the brake pressure of the brake unit 18 to connect the control line 107 to the brake-fluid reservoir 76, 77. This results in a rapid relief of pressure of the control chambers of the two hydraulically activatable valves 103 and 104 to provide a rapid transition from ASR control to a normal braking mode.

A leak in either of the outlet non-return valve 93 of the precharging pump 91 or the electrically activatable ASR outlet valve 97 is detectable during normal braking (braking not undergoing an ABS control) from the fact that the brake pedal 22 yields to a very much greater extent. This pedal travel, which is substantially larger than that pedal travel which the driver expects when he actuates the brake pedal with a specific force (linked to a specific expectancy value of a requisite braking deceleration) alerts the driver to the fact that there must be a fault in the brake system.

Figure 4:
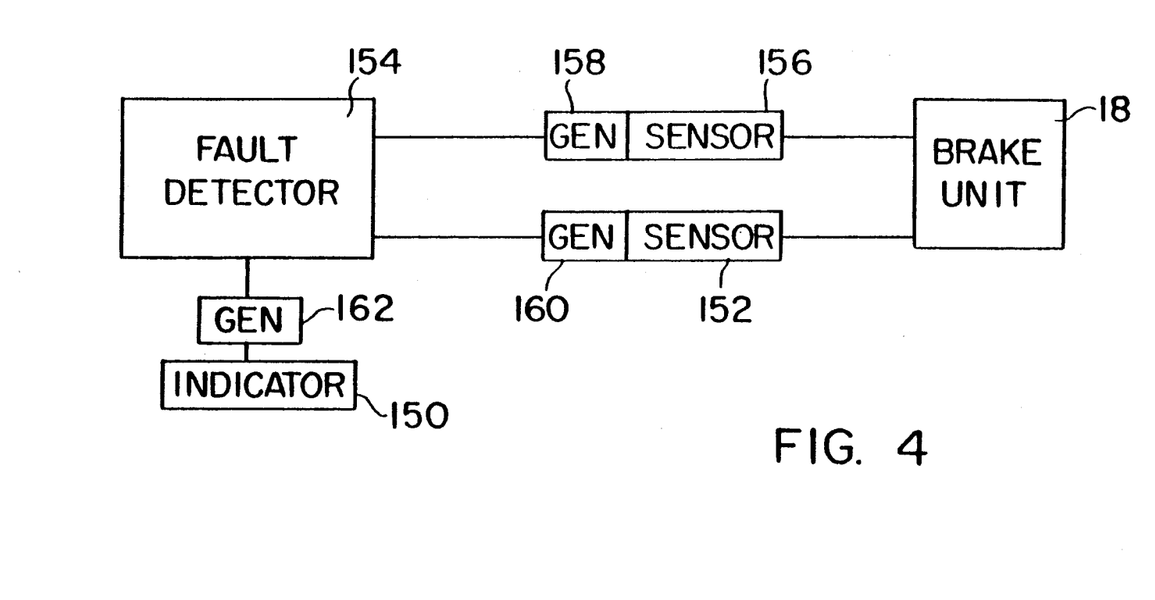
FIG. 4 shows a fault detection system usable with any of the embodiments of FIGS. 1-3.

Since this kind of fault detection is dependent on the experience of the vehicle user, it is desirable to have an objective malfunction detection device. FIG. 4 shows an indicator device 150 which detects the "incongruity" between the pedal-actuating force and the pedal travel to indicate the malfunction situation.

A device of this type can be obtained by providing an electronic or electromechanical sensor 152 which generates an electrical output signal characteristic of the brake pressure in the brake circuit II of the driven vehicle wheels, and a likewise electronic or electromechanically displacement or position transmitter 156 monitoring the position of that brake-unit piston 31 of the brake unit 18 outlet-pressure space 21. The sensors have generators 158, 160 for providing output signals that are fed to a fault detection evaluation unit 154 for a comparison with standard values indicative of a proper functioning of the brake system 10. In the event of a malfunction of the brake system, noted as a result of this comparison, an acoustic or optical indicator 150 can be energized by a signal generator 162.

Electrical output signals suitable for a malfunction detection of this kind can also be generated by means of two displacement or position transmitters which each individually detect the positions of the primary and the secondary piston of a brake unit 18. A malfunction is detectable when the pairs of values of the piston positions obtainable from the output signals of such transmitters do not correspond to the pairs of values characteristic of different brake forces or brake pressure stored in an electronic evaluation unit.

Since the ASR control valve 87 is switched to its shut off Position I for the entire duration of ASR control, the control valve 87 there can be a hydraulically activatable 2/2-way valve instead of the solenoid valve represented by unbroken lines. The control chamber of such a hydraulic action is indicated by broken lines and is connected via a control line 109 to the delivery outlet 92 of the precharging pump 91 (which is activated for the entire duration of an ASR control cycle).

Figure 2:
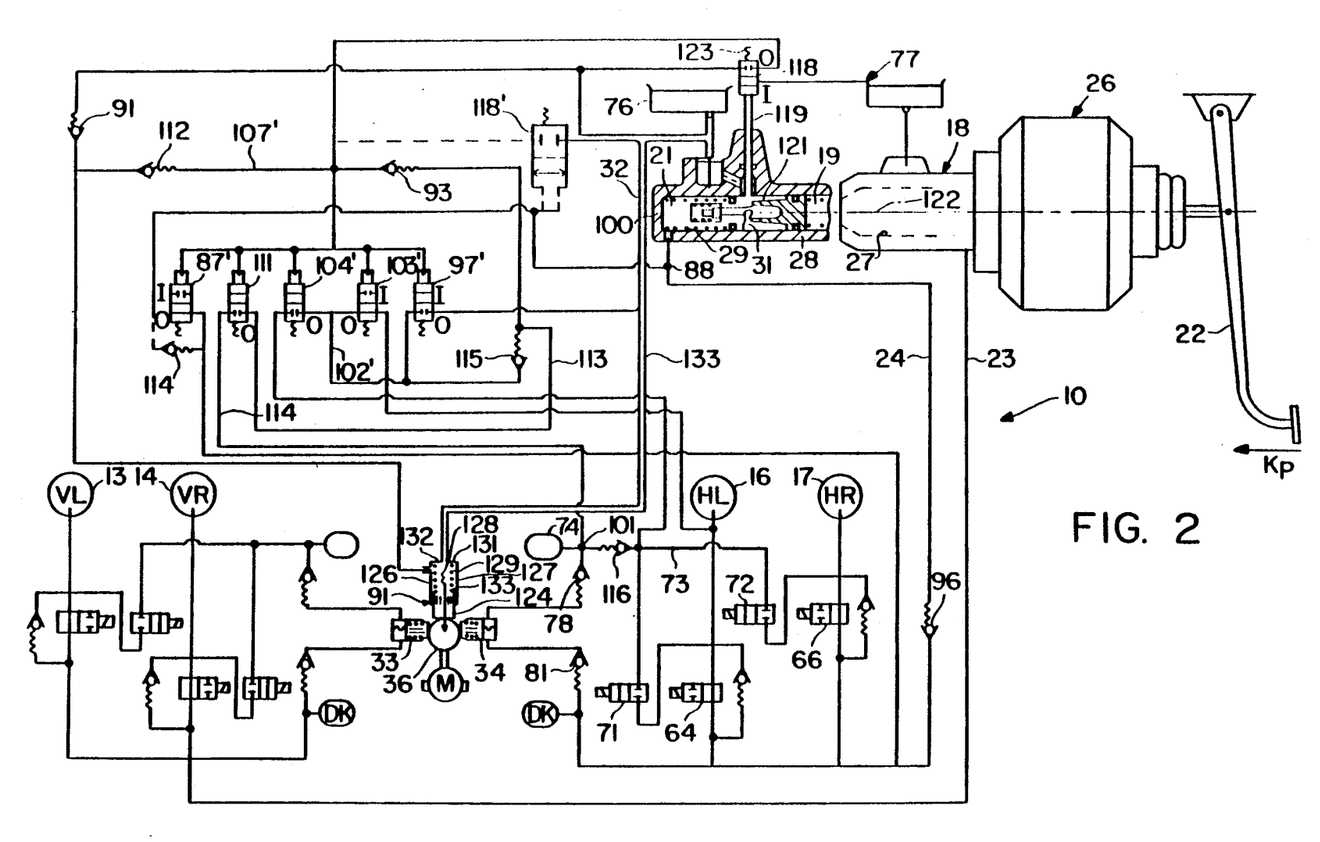
FIG. 2 shows a second embodiment with exclusively pressure-controlled ASR control and ASR outlet valves, with a displacement controlled control pressure reducing valve and a precharging piston pump.

A hydraulically activatable ASR control valve 87 of this type is provided in the exemplary embodiment according to FIG. 2.

In as much as elements of the brake system 10 according to FIG. 2 bear the same reference symbols as elements of the brake system according to FIG. 1, this is intended to refer to their constructional and functional identity or similarity. Primes have been utilized to show functional similarities with constructional differences. Insofar as elements of FIG. 2 bear the same reference symbols as elements of FIG. 1, but are not mentioned specifically in the description of the embodiment according to FIG. 2, this is intended to point to the relevant parts of the description relating to FIG. 1.

In the embodiment according to FIG. 2, the ASR outlet valve 97' (corresponding in functional terms to the electrically activatable ASR outlet valve 97 of the brake system according to FIG. 1) is designed as a hydraulically activatable 2/2-way valve which can be activated together with the ASR control valve 87' and which is activated by means of the outlet pressure of the precharging pump 91' of the ASR. Here the ASR outlet valve 97' is switched to its functional throughflow position I for the entire duration of ASR control. The test line 102' is in communication with the brake-fluid reservoir 76 or 77 of the brake unit 18. As in the embodiment according to FIG. 1, the second ASR outlet valve 104', connected hydraulically in series with the ASR outlet valve 97' and is designed as a 2/2-way valve. This second outlet valve 104' is activated hydraulically by means of the outlet pressure of the precharging pump 91'. In the shut-off basic position 0, assigned to the normal braking mode, the test line 102' is shut off from the return line 73 of the rear-axle brake circuit II and in the functional throughflow position I, assigned to the ASR control, the return line 73 of the rear-axle brake circuit II is put in communication with the test line 102' which can be connected to the brake-fluid reservoir 76, 77 via the first ASR outlet valve 97'.

The test valve 103' is functionally similar to that according to FIG. 1 and, in its illustrated basic position connects the left rear-wheel brake 16 to the test line 102' and, in its shut off position I assigned ASR control, shuts off test line 102' from the said rear-wheel brake 16.

A further 2/2-way supplemental valve 111, also activatable by means of the outlet pressure of the precharging pump 91', is utilized to supply the outlet pressure of the precharging pump 91' to the pump inlet 101 of the return pump 34 of the brake circuit II of the driven vehicle wheels. This valve 111 can be appropriately controlled in such a way that the precharging pump 91' is shut off from the pump inlet 101 of the return pump 34 in the braking mode and is connected to the pump inlet 101 for the duration of ASR control. The relevant alternative functional positions of the supply control valve are designated by 0 (shut off position) and I (throughflow position).

The outlet pressure of the precharging pump 91' is fed via an outlet non-return valve 112 into the control line 107', via which the control chambers of the hydraulically activatable 2/2-way valves 87', 97', 103', 104' and 111 are subjected to pressure. The control line 107' connects the outlet pressure of the precharging pump 91', to the pump inlet 101 of the return pump 34 of the rear-axle brake circuit II via non-return valve 93, supply-line portion 113 and supply control valve 111. The supply-line portion 114 (leading from the supply control valve 111 to the pump inlet 101) is shut off from feeding line portion 113 in the basic position 0 of the supply control valve 111 and is connected to the inlet 101 in the ASR functional position I of the supply control valve 111.

A non-return valve 115 is connected between the supply-line portion 113 (leading from the non-return valve 93 to the supply control valve 111) and the test line 102. This non-return valve 115 is subjected in the shutting-off direction to a higher pressure in the supply portion 113 than in the test line 102' to shut off the supply-line portion 113 leading to the supply control valve 111 from the ASR outlet valve 97' and test line 102'.

Connected between the inlet 101 of the return pump 34 of the brake circuit II of the driven vehicle wheels and its return line 73 is a further non-return valve 116 which is shut off by means of a higher pressure at the pump inlet 101 than in the return line 73. This prevents any possibility that the outlet pressure (from the precharging pump 91 conveyed to the pump inlet 101) would flow towards the pressureless brake-fluid reservoir 76, 77 via the ASR outlet valve 104', the test line 102' and the ASR outlet valve 97'.

A non-return valve 117 is connected in parallel with the ASR control valve 87' and is subjected in the opening direction to a higher pressure at that delivery outlet 88 of the brake unit 18 assigned to the brake circuit II of the driven vehicle wheels than the pressure in the main brake line 24. This ensures that the vehicle can be braked, even in the event of a malfunction of the ASR control valve 87', (i.e. if valve 87' sticks in its shut off ASR position I).

To ensure that braking can also be carried out on the rear axle while a drive-slip control cycle is taking place, it is necessary for the hydraulically activated 2/2-way valves 87', 97', 103', 104' and 111 to be capable of very quickly assuming their basic positions 0 assigned to the braking mode. To this end there is a control-pressure reducing valve 118 which is changed over from its shutting-off basic position 0 to a throughflow position I whenever the brake system 10 is actuated to release the actuating pressure on those valves by connecting the outlet pressure of the precharging pump 91' (that is fed into the control chambers of the hydraulically activatable valves 87', 97', 103', 104' and 11) directly to the pressureless brake-fluid reservoir 76, 77 of the brake unit 18 in its throughflow position I to thus relieve the control pressure very quickly.

This control-pressure reducing valve 118 is designed as a mechanically displacement-controlled valve which is changed over from its basic shut off position 0 to its throughflow position I as a result of a brake-pressure build-up displacement of the brake-unit piston 31 in the secondary outlet-pressure space 21 of the brake unit 18. This change-over occurs in the initial portion of the brake-pressure build-up stroke of the brake-unit piston 31. A ramp-shaped control surface 121 on piston 31 slidingly supports a control tappet 119 which extends radially relative to the longitudinal axis 122 of the brake unit to actuate the control-pressure reducing valve 118 which is held against control surface 121 of the brake-unit piston 31 by valve spring 123. Whenever the control surface 121 moves past its supporting end, the tappet 119 experiences a radially outward movement by which the control-pressure reducing valve 118 is changed over to its throughflow position.

Instead of the mechanically displacement-controlled control-pressure reducing valve 118, one could use a hydraulically activatable control-pressure reducing valve 118' (as represented by broken lines) which is activated by means of the outlet pressure of the brake unit generated during a braking operation and which is thereby changed over to its throughflow position I.

In the embodiment according to FIG. 2, the precharging pump 91' is designed as a self-priming piston pump which is also driven by the eccentric drive 36 of the two return pumps 33 and 34. The piston 124 of pump 91' is held bearing constantly against the circumferential surface of the driving eccentric by means of a spring 126.

The inlet valve of the precharging pump 91', designated as a whole by 127, is designed so that it is open when the pump piston 94 executes its suction stroke leading away from the inlet port 128 of the pump chamber 129. During the last phase of this suction stroke and the initial phase of the subsequent delivery stroke, the pump piston 124 again moves towards the inlet port 128, and as a result of the sealing bearing of its valve body 131 against a valve seat 132 surrounding the inlet port 128, shuts off the pressureless brake-fluid line 133 leading from the brake-fluid reservoir 76, 77 to the precharging pump 91'. The valve body 131 is connected to the pump piston 124 via a short helical spring 133. The length of the spring 133, in the relaxed state, is calculated so that the valve body 131 is lifted off from the valve seat 132 (beyond a minimum distance of the piston 124 from the inlet port 128 of the pump chamber 129 corresponding to a predominant part of the piston stroke) so that brake fluid can flow unimpeded into the pump chamber 129. After a short initial portion of the pressure build-up stroke of the piston 124, the inlet valve 127 once again assumes its shut off position.

The outlet non-return valve 112 connected between the pump outlet 92 and the control line 107 prevents the possibility that the control pressure fed into the control chambers of the hydraulically controlled valves 87', 97', 103', 104' and 111 will be relieved via the precharging pump 91' when the inlet valve 127 of the latter is open.

During normal braking, the non-return valve 93 and the ASR outlet valve 97' are subjected to the brake pressure on the side (their connection side facing away from the brake-fluid reservoir 76, 77) so that a leak from any of these valves would be detectable from the yielding of the brake pedal or from an output signal of a monitoring device already explained above.

Figure 3:
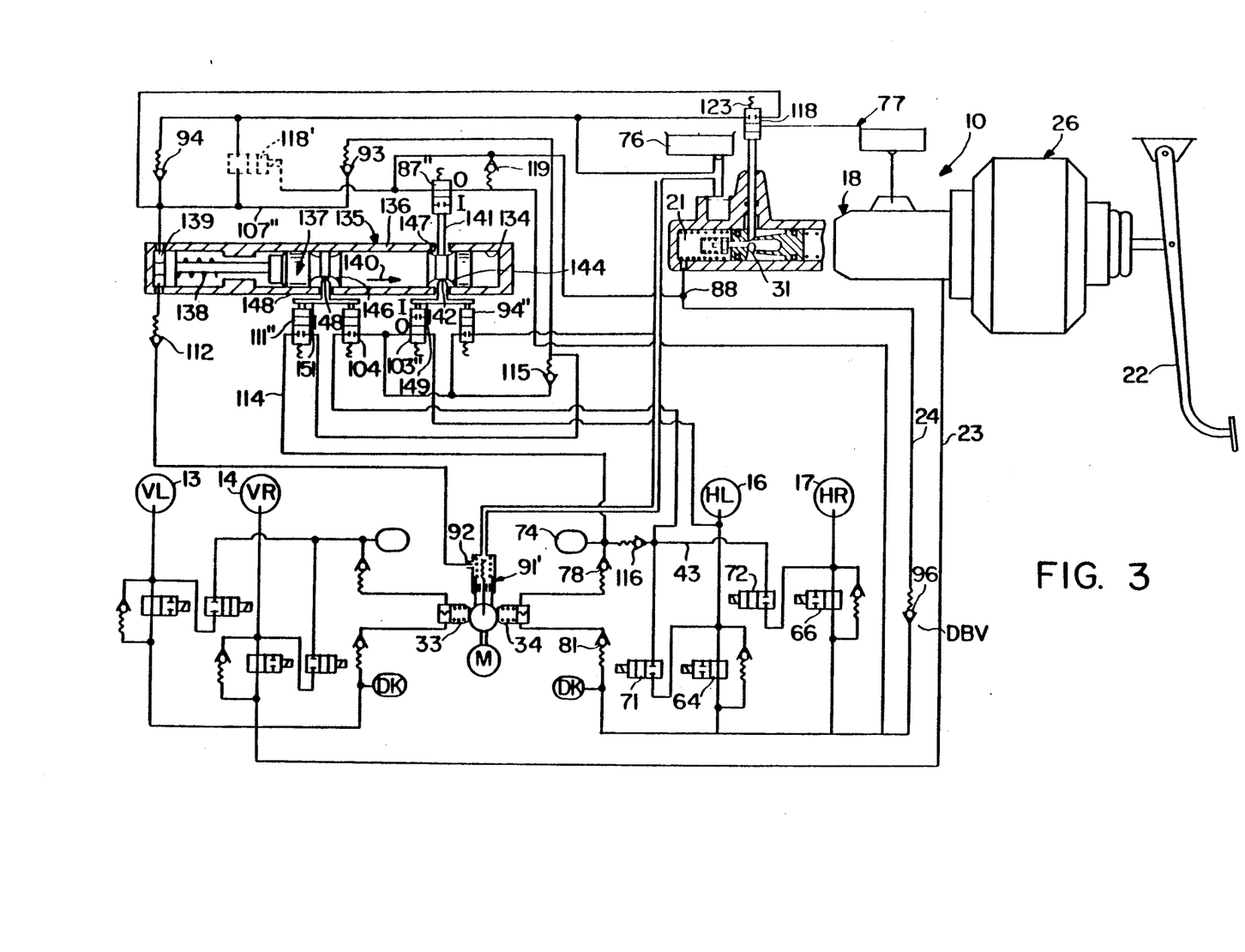
FIG. 3 shows a third embodiment corresponding in functional terms to the embodiment according to FIG. 2, but with a hydromechanical control slide for actuating the pressure-controlled valves.

In FIG. 3, where elements are given reference symbols, without these elements being mentioned specifically, this is intended to point to the description of the identically designated constructional and functional elements which was made with reference to FIGS. 1 and 2.

The exemplary embodiment according to FIG. 3 differs from that according to FIG. 2 only in the manner of obtaining the joint actuation of the ASR control valve 87, ASR outlet valve 97, test valve 103, further ASR outlet valve 104 and supply control valve 111.

To actuate these valves, a control slide 135 is provided. The control slide 135 has an actuating piston 137 arranged displaceably in a longitudinal bore 134 of a housing 136 and is urged by a restoring spring 138 into its illustrated basic position. Here the mechanically actuable valves 87'', 97'', 103'', 104'' and 111'' assume their illustrated basic positions 0. A control-pressure space 139 of the control slide 135 is connected via an outlet non-return valve 112 to the delivery outlet 92 of the precharging pump 91'. The outlet pressure of the precharging pump 91' is limited to a specific maximum value by the pressure-limiting valve 94 which can open to vent the output to the reservoir 76. The actuating piston 137 of the control slide 135 is displaceable to the right (direction of the arrow 140) and counter to the restoring force of the spring 138 by the outlet pressure from the precharging pump 91' and when the control-pressure space 139 is relieved of pressure, the effect of the restoring spring 138 returns the slide 135 to its basic position illustrated.

In this basic position of the control slide 135 (assigned to the normal braking mode or to a braking mode undergoing an ASR), control tappets 141, 142 and 143 provided for actuating the valves 87", 97", 103", 104" and 111" are supported on the bottom of annular grooves 144 and 146 of an actuating piston 137, having respectively conical or ramp-shaped control flanks 147 and 148 which adjoin the groove bottom. As a result of a displacement of the slide 135 in the direction of the arrow 140, the control tappets 141 and 142 or 143 experience radial outward movements which cause a change-over of the position of the above-mentioned valves 87", 97", 103", 104" and 111".

The ASR control valve 87" is actuated directly by means of the control tappet 141, while the ASR outlet valve 97", the test valve 103", the further ASR outlet valve 104" and the supply control valve 111" are jointly actuable in pairs by means of the control tappet 142 or 143. These latter control tappet pairs each engage a bridge 149, 151 on the respective pair of valves 97", 103" and 104", 111", to jointly and simultaneously switch the valves 87", 97", 103", 104" and 111".

The pressure relief necessary for a rapid transition from an ASR control to a braking mode, is achieved by a control-pressure reducing valve 118" which, as already explained (reference to FIG. 2) can be activatable mechanically or hydraulically.

The safety valve 118" can be omitted, if the precharging pump is designed as a gear pump with a high leakage rate, which allows a rapid return flow of brake fluid to the brake-fluid reservoir 76, 77, after being stopped. The ASR control valve 87" can also be connected between the brake unit 118 and the brake-fluid reservoir 76, 77.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A hydraulic dual-circuit vehicle brake system comprising:
   a plurality of wheel brakes;
   a first brake circuit assigned to driven wheels of a vehicle;
   a second brake circuit assigned to non-driven wheels of the vehicle;
   a brake unit that actuates vehicle brakes and having first and second outlet-pressure spaces, said first brake circuit being coupled to said first outlet-pressure space and said second brake circuit being coupled to the second outlet-pressure space;
   a buffer accumulator that accumulates brake fluid;
   a return line connected between a wheel brake and the buffer accumulator during anti-lock control;
   a return pump having an inlet side connected to the buffer accumulator and an outlet side connected to the brake unit;
   an anti-lock system ABS that operates on the first brake circuit in a return-flow manner such that, during pressure-reduction phases of anti-lock control by the anti-lock system ABS, a quantity of brake fluid corresponding to a quantity of brake fluid that flows off from a wheel brake into the return line connected to the buffer accumulator during anti-lock control, is pumped into the brake unit by the return;
   a drive-slip control device ASR having an auxiliary-pressure source that decelerates a vehicle wheel that is tending to spin by subjecting the wheel brake of the vehicle wheel to brake pressure from the auxiliary-pressure source in such a way that a drive slip of the vehicle wheel remains within a value range compatible with a sufficient dynamic stability of the vehicle;
   a precharging pump connected to the inlet side of the return pump via an outlet non-return valve for supplying the auxiliary pressure source brake pressure to driven wheel brakes of the vehicle wheels to be decelerated by the drive-slip control ASR such that brake fluid is conveyed from a reservoir of the brake unit to an inlet side of the return pump of the first brake circuit, said precharging pump having an outlet;
   an ASR control valve that has a basic position for normal braking in which brake fluid is positively displaced into the brakes of the driven vehicle wheels as a result of the actuation of the brake unit, and an alternative functional ASR position in which brake fluid is prevented from flowing off from a main brake line of the first brake circuit towards the first outlet-pressure space of the brake unit;
   an ASR outlet valve connected between the reservoir of the brake unit and a pressure medium line;
   valve means activatable by outlet pressure of the precharging pump through a control line coupled between the precharging pump and the valve means;
   wherein during normal braking the valve means connects the outlet non-return valve of the precharging pump and the ASR outlet valve to the pressure medium line subjected to brake pressure, and during drive-slip control ASR connects the pressure medium line to the return line and the outlet of the precharging pump to the inlet of the return pump of the first brake circuit.

2. A brake system according to claim 1, further comprising means for moving the ASR control valve into the alternative functional ASR position in response to outlet pressure of the precharging pump.

3. A brake system according to claim 2, wherein the valve means includes two hydraulically controlled outlet valves having a common connection, said brake system further comprising:
   means for moving the ASR outlet valve into the basic position opening the connection between the return line and the brake-fluid reservoir in response to outlet pressure of the precharging pump;
   a first non-return valve connected between the inlet side of the return pump and the return line of the first brake circuit, said first non-return valve being shut off by relatively higher pressure at the inlet side of the return pump than at the return line; and
   a second non-return valve which is connected between the common connection of the two hydraulically controlled outlet valves of the valve means and the outlet non-return valve.

4. A braking system according to claim 2, wherein the ASR control valve is connected between the brake unit and the brake-fluid reservoir.

5. A brake system according to claim 1, wherein the valve means includes two hydraulically controlled outlet valves having a common connection, said brake system further comprising:

means for moving the ASR outlet valve into the basic position opening the connection between the return line and the brake-fluid reservoir in response to outlet pressure of the precharging pump;

a first non-return valve connected between the inlet side of the return pump and the return line of the first brake circuit, said first non-return valve being shut off by relatively higher pressure at the inlet side of the return pump than at the return line; and a second non-return valve which is connected between the common connection of the two hydraulically controlled outlet valves of the valve means and the outlet non-return valve.

6. A braking system according to claim 5, wherein the valve means includes a supply control valve which is actuated by outlet pressure of the precharging pump into a functional position wherein the outlet of the precharging pump is connected to the inlet of the return pump of the first brake circuit wheels via the outlet non-return valve.

7. A braking system according to claim 1, further comprising a control slide having an actuating piston which is responsive to outlet pressure of the precharging pump to cause the control slide to be displaced and actuate the valve means through mechanical control elements.

8. A braking system according to claim 7, wherein a non-return valve is connected between a pump outlet of the precharging pump and the control line to allow control pressure to pass to the control-pressure space of the control slide; and wherein the non-return valve is moved into a throughflow position by a relatively higher pressure at an outlet of the precharging pump than a pressure in the control line and into a shut off position by relatively higher pressure in the control line than at the outlet of the precharging pump.

9. A braking system according to claim 1, further comprising a control-pressure reducing valve which connects the control line that feeds control pressure to the hydraulically activatable valve means to the brake-fluid reservoir in response to a braking actuation of the brake unit.

10. A braking system according to claim 9, wherein displacement of a piston of the brake-unit occurs during actuation of the brake unit to move the control-pressure reducing valve into a functional position to connect the control line to the brake-fluid reservoir.

11. A braking system according to claim 9, wherein the control-pressure reducing valve is a change-over valve that is controlled by brake pressure from the brake unit.

12. A braking system according to claim 1, further comprising means for driving the return pump, and wherein the precharging pump is a piston pump that is driveable by the means for driving the return pump.

13. A braking system according to claim 12, wherein the precharging pump is a self-priming piston pump.

14. A braking system according to claim 13, wherein the precharging pump includes a displacement-controlled inlet valve that is moveable into an open position while the piston of the self-priming piston pump is executing a final portion of a suction stroke and an initial portion of a delivery stroke, said displacement-controlled inlet valve otherwise being held in a shut off position.

15. A braking system according to claim 13, further comprising a non-return valve connected between a pump outlet of the precharging pump and the control line to allow control pressure to pass to the valve means; and wherein the non-return valve is moved into a throughflow position by a relatively higher pressure at the outlet of the precharging pump than a pressure in the control line and into a shut off position by relatively higher pressure in the control line than at the outlet of the precharging pump.

16. A braking system according to claim 1, further comprising fault detection means for generating an indicator signal characteristic of either proper or faulty functioning of the brake system as a result of processing a first sensor output signal which is a measure of displacement of a piston of the brake unit and a second sensor output signal which is a measure of a brake-actuating force arising as a result of the actuation of the brake unit.

17. A braking system according to claim 16, further comprising a pressure sensor which monitors brake pressure occurring in one of the brake circuits of the vehicle and generates the second sensor output signal.

18. A braking system according to claim 17, wherein the brake pressure is sensed in the first brake circuit.

19. A braking system according to claim 1, wherein the brake unit is a tandem master cylinder with two pistons, the brake system further comprising fault detection means having two displacement sensors each monitoring one of the two pistons of the tandem master cylinder and generating electrical output signals characteristic of the piston positions to generate a signal characteristic of either proper or faulty functioning of the brake system as a result of a comparative processing of these output signals.

20. A braking system according to claim 1, wherein the ASR control valve is connected between the brake unit and the brake-fluid reservoir.

* * * * *